(12) United States Patent
Gong (10) Patent No.: US 10,764,943 B2
(45) Date of Patent: Sep. 1, 2020

(54) PEER TO PEER NETWORKING AND SHARING SYSTEMS AND METHODS

(71) Applicant: Intel Corporation, Santa Clara, CA (US)

(72) Inventor: Michelle X. Gong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/103,563

(22) Filed: Aug. 14, 2018

(65) Prior Publication Data

US 2019/0239260 A1 Aug. 1, 2019

Related U.S. Application Data

(63) Continuation of application No. 14/998,219, filed on Dec. 26, 2015, now Pat. No. 10,051,666, which is a
(Continued)

(51) Int. Cl.
*H04W 76/11* (2018.01)
*H04L 29/06* (2006.01)
(Continued)

(52) U.S. Cl.
CPC ......... *H04W 76/11* (2018.02); *H04L 12/5692* (2013.01); *H04L 63/0807* (2013.01);
(Continued)

(58) Field of Classification Search
None
See application file for complete search history.

(56) References Cited

U.S. PATENT DOCUMENTS

| 6,442,571 B1 | 8/2002 | Haff et al. |
| 7,783,777 B1 * | 8/2010 | Pabla ................. H04L 67/1063 709/238 |

(Continued)

FOREIGN PATENT DOCUMENTS

| EP | 2815551 A1 | 12/2014 |
| EP | 3054649 A1 | 8/2016 |
| WO | 2013122571 A1 | 8/2013 |

OTHER PUBLICATIONS

U.S. Appl. No. 13/995,517, filed Jun. 19, 2013, Peer to Peer Networking and Sharing Systems and Methods, U.S. Pat. No. 9,294,562.
(Continued)

*Primary Examiner* — Michael J Moore, Jr.
(74) *Attorney, Agent, or Firm* — Schwegman Lundberg & Woessner, P.A.

(57) ABSTRACT

An embodiment includes peer-to-peer (P2P) pairing protocols that mutually authenticate both end points and do not rely upon a backend server or a central certificate provisioning server. An embodiment provides a persistent control path for sending inter-peer control information (e.g., synchronization messages). Another inter-peer path includes an "on-demand" data path enabled when a unit determines content is ready for sharing. After the content is shared, the data path may be deconstructed, which saves resources on both sides and makes the framework more scalable. Also, embodiments include graphical user avatars to whereby a first peer shares content with a second peer by dragging content over the avatar.

18 Claims, 5 Drawing Sheets

Related U.S. Application Data continuation of application No. 13/995,517, filed as application No. PCT/US2012/024966 on Feb. 14, 2012, now Pat. No. 9,294,562.

(51) Int. Cl.
*H04L 29/08* (2006.01)
*H04L 12/54* (2013.01)
*H04W 12/06* (2009.01)

(52) U.S. Cl.
CPC ............ *H04L 67/104* (2013.01); *H04L 69/14* (2013.01); *H04W 12/06* (2013.01)

(56) References Cited

U.S. PATENT DOCUMENTS

| | | | |
|---|---|---|---|
| 8,750,799 B2 | 6/2014 | Giles et al. | |
| 8,781,398 B2 | 7/2014 | Konded et al. | |
| 8,923,760 B2 | 12/2014 | Iwasaki | |
| 8,998,076 B2 | 4/2015 | Chang | |
| 9,014,760 B2 | 4/2015 | Song et al. | |
| 9,031,500 B2 | 5/2015 | Tiedemann et al. | |
| 9,037,085 B2 | 5/2015 | Mei | |
| 9,294,562 B2 | 3/2016 | Gong | |
| 10,051,666 B2 | 8/2018 | Gong | |
| 2002/0143855 A1* | 10/2002 | Traversat .............. | G06F 9/4416 709/202 |
| 2003/0163702 A1 | 8/2003 | Vigue et al. | |
| 2003/0204602 A1 | 10/2003 | Hudson et al. | |
| 2004/0064568 A1* | 4/2004 | Arora ...................... | H04L 29/06 709/228 |
| 2004/0088348 A1* | 5/2004 | Yeager .................. | H04L 67/104 709/202 |
| 2004/0243580 A1 | 12/2004 | Markki et al. | |
| 2006/0215652 A1 | 9/2006 | Strandridge et al. | |
| 2007/0237153 A1 | 10/2007 | Slaughter et al. | |
| 2007/0280109 A1 | 12/2007 | Jaatinen | |
| 2008/0005114 A1* | 1/2008 | Li ........................ | H04L 67/2842 |
| 2008/0037527 A1* | 2/2008 | Chan .................... | H04L 67/104 370/353 |
| 2008/0049619 A1 | 2/2008 | Twiss | |
| 2008/0109852 A1 | 5/2008 | Kretz et al. | |
| 2008/0148379 A1 | 6/2008 | Xu et al. | |
| 2008/0288580 A1 | 11/2008 | Wang et al. | |
| 2009/0055506 A1 | 2/2009 | Hudson et al. | |
| 2010/0106978 A1 | 4/2010 | Cheng et al. | |
| 2010/0167646 A1 | 7/2010 | Alameh et al. | |
| 2010/0215024 A1 | 8/2010 | Chiang | |
| 2011/0081923 A1 | 4/2011 | Forutanpour et al. | |
| 2011/0211565 A1 | 9/2011 | Jing et al. | |
| 2011/0225311 A1* | 9/2011 | Liu ........................ | H04L 45/125 709/231 |
| 2012/0173740 A1* | 7/2012 | Shukla .................. | H04L 67/141 709/228 |
| 2014/0196140 A1 | 7/2014 | Gong | |
| 2016/0135237 A1 | 5/2016 | Gong | |

OTHER PUBLICATIONS

U.S. Appl. No. 14/998,219, filed Dec. 26, 2015, Peer to Peer Networking and Sharing Systems and Methods, U.S. Pat. No. 10,051,666.
"U.S. Appl. No. 13/995,517,312 Amendment filed Jan. 20, 2016", 8 pgs.
"U.S. Appl. No. 13/995,517,312 Amendment filed Sep. 21, 2015", 8 pgs.
"U.S. Appl. No. 13/995,517,Non Final Office Action dated Sep. 8, 2014", 8 pgs.
"U.S. Appl. No. 13/995,517,Preliminary Amendment filed Jun. 19, 2013", 7 pgs.
"U.S. Appl. No. 13/995,517,PTO Response to Rule 312 Communication dated Feb. 19, 2016", 2 pgs.
"U.S. Appl. No. 13/995,517,Response filed Jun. 29, 2015 to Final Office Action dated Mar. 3, 2015", 8 pgs.
"U.S. Appl. No. 13/995,517,Response filed Dec. 8, 2014 to Non Final Office Action dated Sep. 8, 2014", 9 pgs.
"U.S. Appl. No. 14/998,219,312 Amendment filed Jul. 2, 2018", 6 pgs.
"U.S. Appl. No. 14/998,219,PTO Response to Rule 312 Communication dated Jul. 16, 2018", 2 pgs.
"U.S. Appl. No. 14/998,219,Response filed Jan. 29, 2018 to Non Final Office Action dated Aug. 10, 2017", 6 pgs.
"European Application Serial No. 12868804.1, Communication Pursuant to Article 94(3) EPC dated Nov. 23, 2018", 6 pgs.
"European Application Serial No. 12868804.1, Response filed Apr. 19, 2016 to Extended European Search Report dated Sep. 23, 2015", 9 pgs.
"European Application Serial No. 16163445.6, Response filed Feb. 10, 2017 to Extended European Search Report dated Jun. 22, 2016", 12 pgs.
"International Application Serial No. PCT/US2012/024966, International Preliminary Report on Patentability dated Aug. 24, 2014", 5 pgs.
European Patent Office, "Extended European Search Report," issued in connection with European Patent Application No. 16163445.6, dated Jun. 22, 2016, 6 pages.
International Searching Authority, "International Search Report and Written Opinion," issued in connection with International Application No. PCT/US2012/024966, dated Jan. 21, 2013, 8 pages.
European Patent Office, "Extended European Search Report," issued in connection with European Patent Application No. 12868804.1, dated Sep. 23, 2015, 6 pages.
United States Patent and Trademark Office, "Non-final Office Action," issued in connection with U.S. Appl. No. 14/998,219, dated Aug. 10, 2017, 16 pages.
United States Patent and Trademark Office, "Notice of Allowance," issued in connection with U.S. Appl. No. 14/998,219, dated Apr. 11, 2018, 6 pages.
United States Patent and Trademark Office, "Supplemental Notice of Allowability," issued in connection with U.S. Appl. No. 13/995,517, dated Nov. 5, 2015, 2 pages.
United States Patent and Trademark Office, "Notice of Allowance," issued in connection with U.S. Appl. No. 13/995,517, dated Oct. 22, 2015, 5 pages.
United States Patent and Trademark Office, "Notice of Allowance," issued in connection with U.S. Appl. No. 13/995,517, dated Jun. 22, 2015, 7 pages.
United States Patent and Trademark Office, "Final Office Action," issued in connection with U.S. Appl. No. 13/995,517, dated Mar. 3, 2015, 7 pages.

\* cited by examiner

PEER TO PEER NETWORKING AND SHARING SYSTEMS AND METHODS

CROSS-REFERENCE TO RELATED APPLICATIONS

This patent is a continuation of U.S. patent application Ser. No. 14/998,219, titled "PEER TO PEER NETWORKING AND SHARING SYSTEMS AND METHODS," filed Dec. 26, 2015, which is a continuation of U.S. patent application Ser. No. 13/995,517, titled "PEER TO PEER NETWORKING AND SHARING SYSTEMS AND METHODS," filed Jun. 19, 2013, which arises from a 371 nationalization of International Patent Application Serial No. PCT/US2012/024966, titled "PEER TO PEER NETWORKING AND SHARING SYSTEMS AND METHODS," filed Feb. 14, 2012. The subject matter of these applications is incorporated herein by reference in their entireties.

BACKGROUND

Users of mobile devices (e.g., personal digital assistants (PDA), Smartphones, tablets, netbooks, notebooks, and the like) may desire to share content with one another via peer-to-peer (P2P) sharing without having to, for example, rely on an infrastructure network or a backend server. However, doing so can be difficult. For instance, users of such devices may not be network savvy and consequently may have trouble discovering one another's devices and then communicating between those devices. A peer may have a difficult time even knowing who is available for P2P sharing. In addition, efforts to authenticate one peer to another peer and also securely communicate data between the peers may be complicated if, for example, there is no central certificate provisioning server available, such as a Certificate Authority (CA), to help broker certificate exchange between the peers. Further still, the general graphical user interface (GUI) provided to a peer may be complex and frustrate efforts for P2P content sharing. For example, the GUIs provided may require the peer to navigate complex depictions of file trees and the like instead of using more intuitive means for transferring content.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. Also, while similar or same numbers may be used to designate same or similar parts in different figures, doing so does not mean all figures including similar or same numbers constitute a single or same embodiment.

P2P sharing with mobile devices over wireless networks may not be as straight forward as P2P sharing with non-mobile devices (e.g., desktop computers) over a wired network. Mobile devices often appear, disappear, and then reappear on networks. The networks themselves may be temporary and form and then disband regularly or irregularly. With this network uncertainty the connection address for any peer may change and consequently, may need to be updated to other peers. Thus, connecting one to another can be complicated. Further, security between peers can be difficult to ensure. For example, many mobile devices connect to networks wirelessly. Therefore, their communications are more susceptible to snooping, man-in-the-middle (MITM) attacks, and the like. Also, some technologies rely on near field communications (NFC). However, the NFC method for sharing is short-range in distance and is limited due to low data rate communication capacity. Further, some technologies, such as "bump" technologies (which may rely on two devices monitoring their respective accelerometer readings recorded when the devices bump into one another), require the peers to bump one another each time content sharing is desired. The repeated bumping protocol can be burdensome to users.

Also, mobile devices may have limited power capacity and/or communication bandwidth. Therefore, the ability for two devices to transmit large amounts of data (e.g., movies, videos, streaming data, music, and the like) between one another may result in control information (e.g., Hello messages, user information, device information, synchronization messages, and the like) being help up behind the bottleneck created by the large data transfer. Thus, inter peer communication of such control data may suffer from "head of queue" blocking brought on by the large data transfer.

Further still, the GUI provided to the peer that is a source for the shared content, as well as the peer that receives the data, may be non-intuitive and non-informative. For example, the GUIs may not readily make apparent what peers are connected to one another and whether those connected peers are agreeable to content sharing.

An embodiment of the invention includes paths for efficiently authenticating peers to one another. Because P2P networks may have many peers entering and exiting the network at any time, the embodiment facilitates peer discovery. The embodiment also facilitates initial authentication of a peer to another peer upon the first connection between those peers. Further, subsequent connections between those peers will have a shorter connection setup protocol that is built upon past authentications between the peers. Such an embodiment has an advantage over existing authentication protocols in that there is secure, authenticated communication between the nodes, yet setting up that secure, authenticated communication between the nodes is efficient and not overly burdensome to the user. Another advantage is that reliance upon a backend server (as used with many bump technology devices) or a central certificate provisioning server (which may not always be available to peers) for authentication is unnecessary in some embodiments. Also, such embodiments are not limited to pairing peers that are both included in a single local network (e.g., a local area network) or to devices in proximity with one another via NFC paths. Thus, pairing is made easier over greater distances with faster, broader bandwidths for communication of potentially large amounts of content.

An embodiment of the invention provides parallel, independent control and data paths. The control path includes a persistent control path for control information such as Hello messages, user information, device information, synchronization messages, and the like. The data path(s) may be on-demand data paths. Thus, control information may be transmitted between peers via the control path while, simultaneously, large amounts of video data and the like are transmitted between the peers via the one or more data paths. The control path may be "persistent" and exist as long as the peers are coupled to one another via a network. However, the data path(s) may be enabled only when a unit determines content is ready for sharing. After the content is shared, the data path(s) may be deconstructed, which may save resources on both sides of the P2P wireless connection and make the framework more scalable. An advantage of the embodiment is that head of queue blocking is avoided and/or lessened such that connections between peers are more robust and content transfer between the peers is more efficient.

An embodiment includes the use of avatars in GUIs. For example, when a first peer securely connects to an authenticated second peer, the second peer transfers a user avatar to the first peer. Then, to share content with the second peer, the first user drags the content (e.g., a music file) over the avatar that represents the second peer. As an advantage, the content is then, intuitively, transferred to the second peer.

Thus, various embodiments provide P2P sharing solutions superior to existing sharing technologies.

Figure 1:
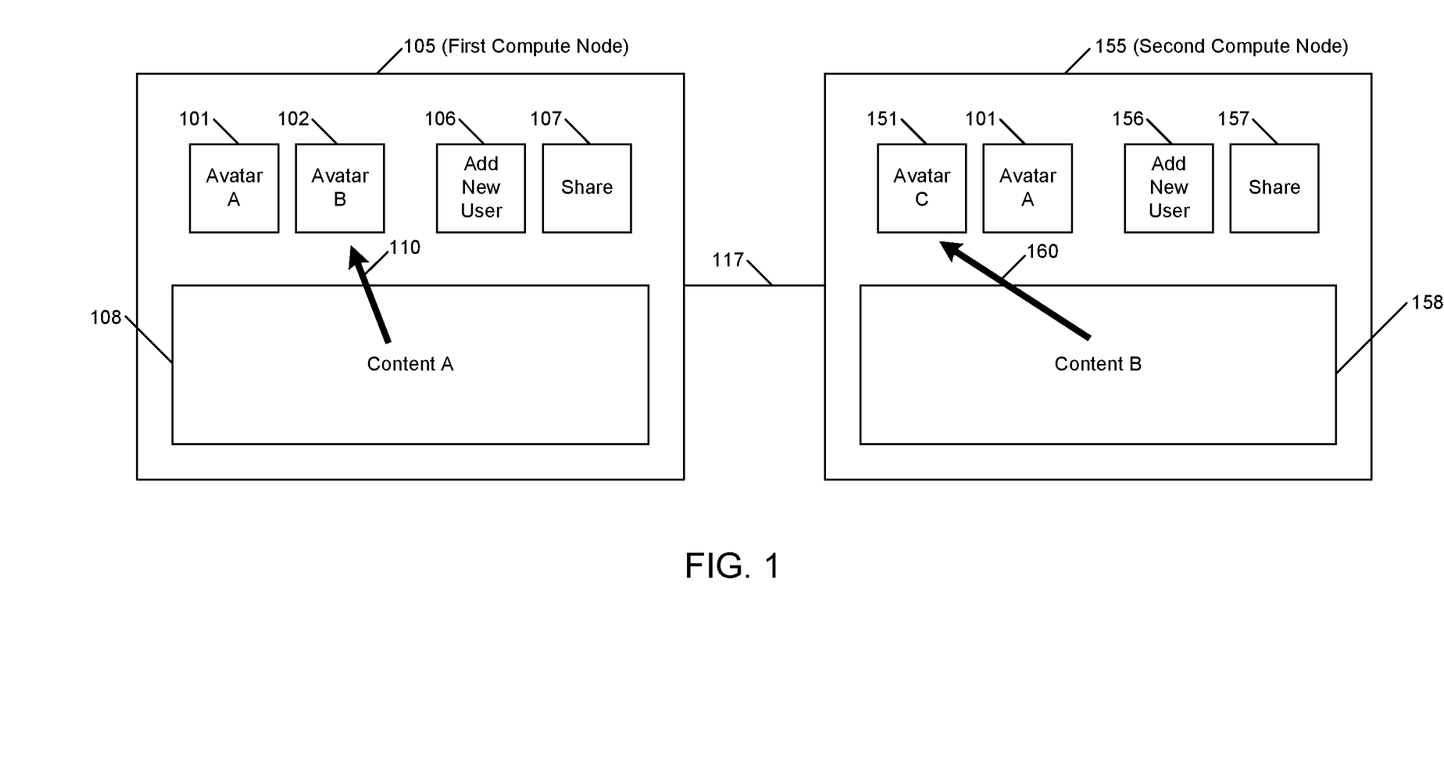
FIG. 1 includes GUIs in an embodiment of the invention for P2P sharing.
Figure 2:
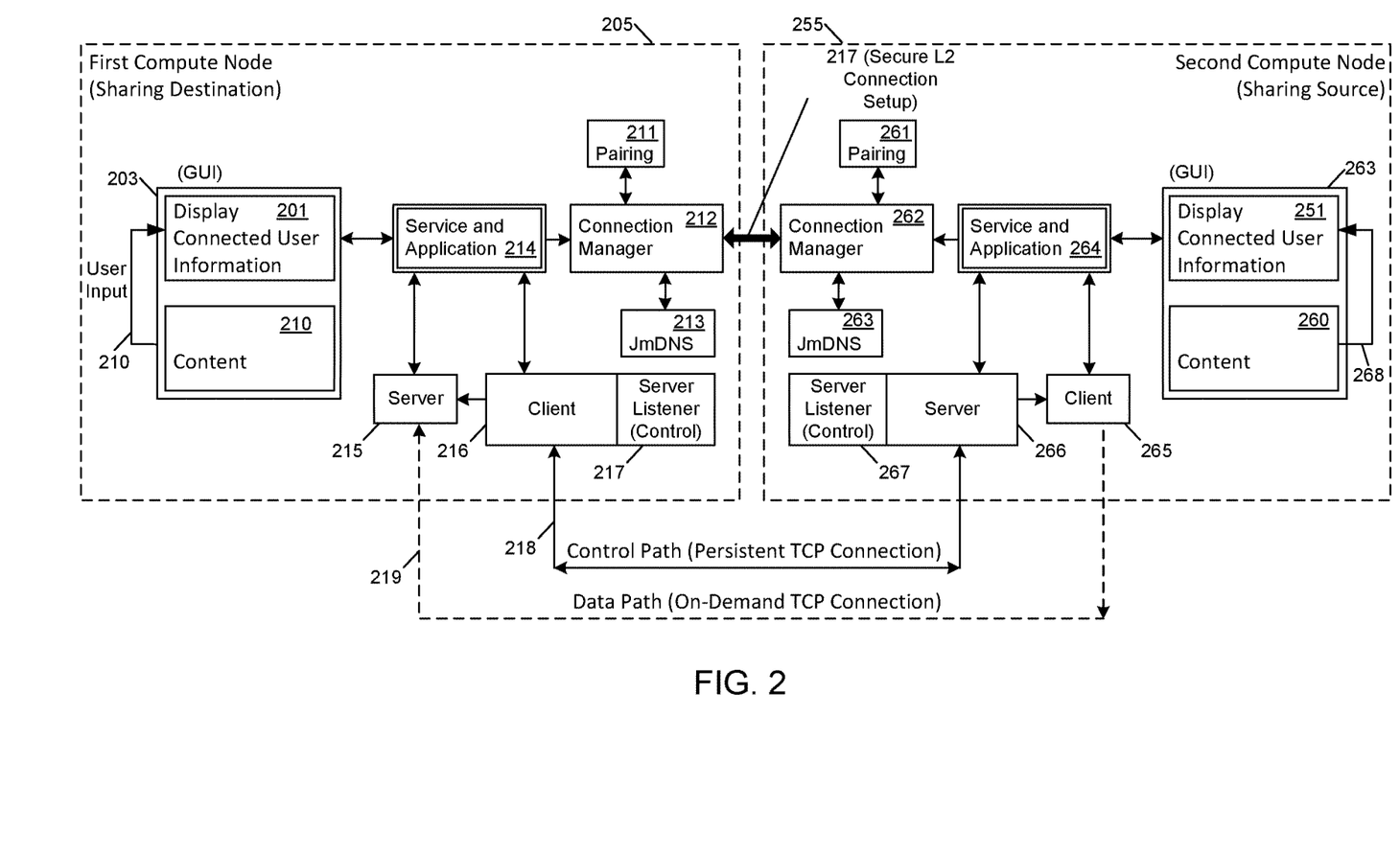
FIG. 2 includes inter-peer control and data paths in an embodiment of the invention.
Figure 3:
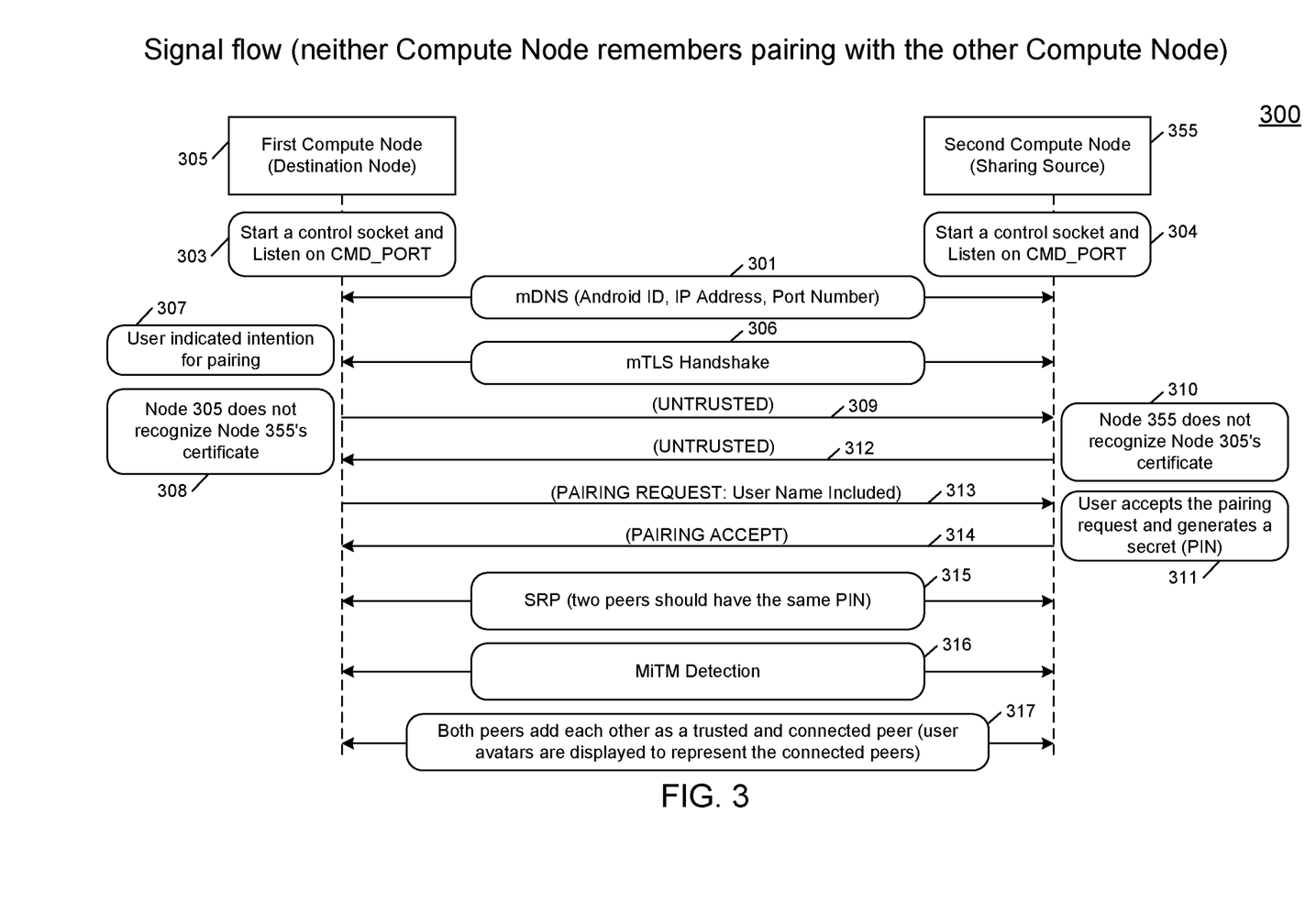
FIG. 3 includes signaling flow in an embodiment of the invention for pairing between peers.
Figure 4:
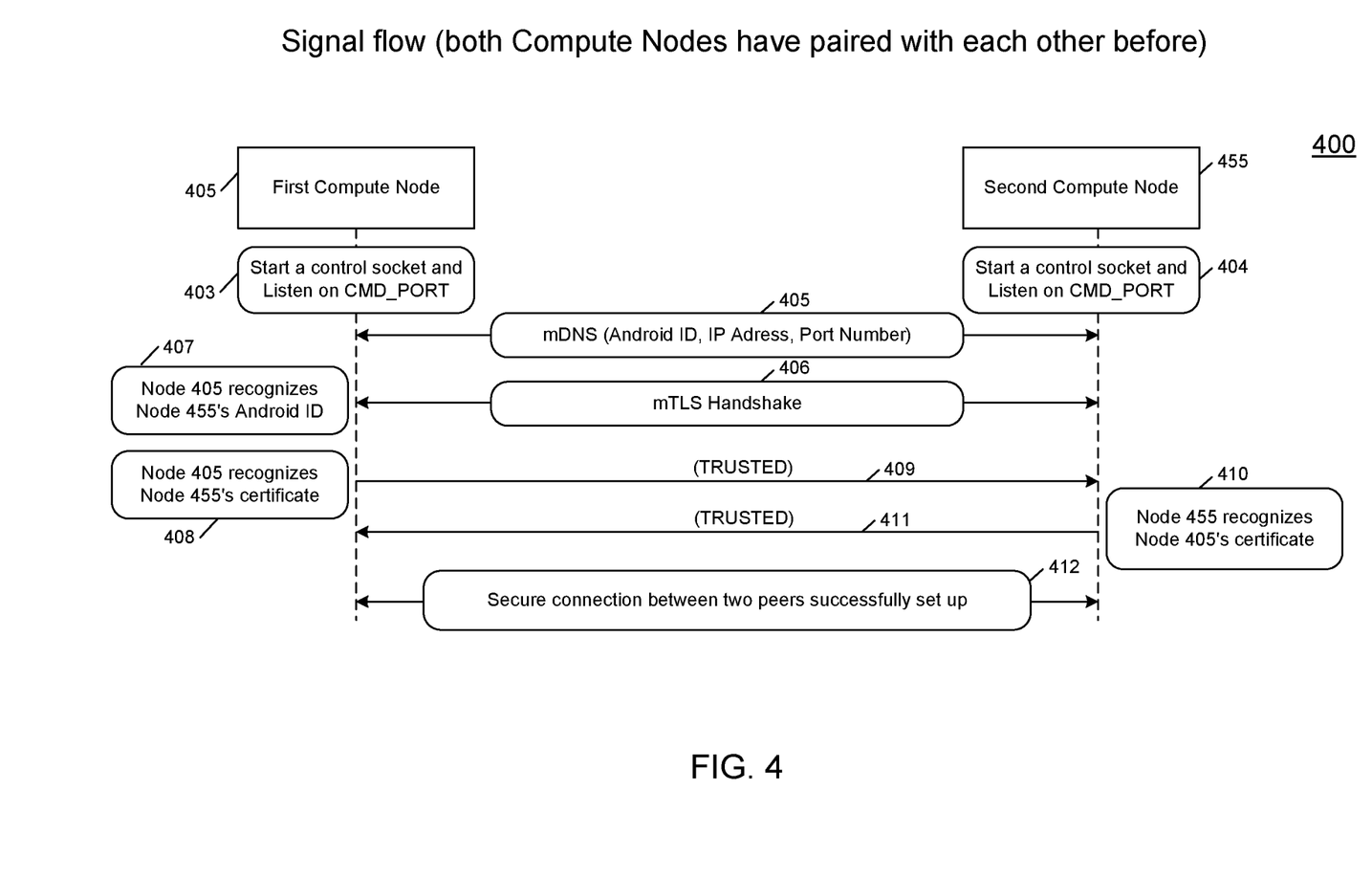
FIG. 4 includes signaling flow in an embodiment of the invention wherein pairing is no longer used for peers that have previously paired before.
Figure 5:
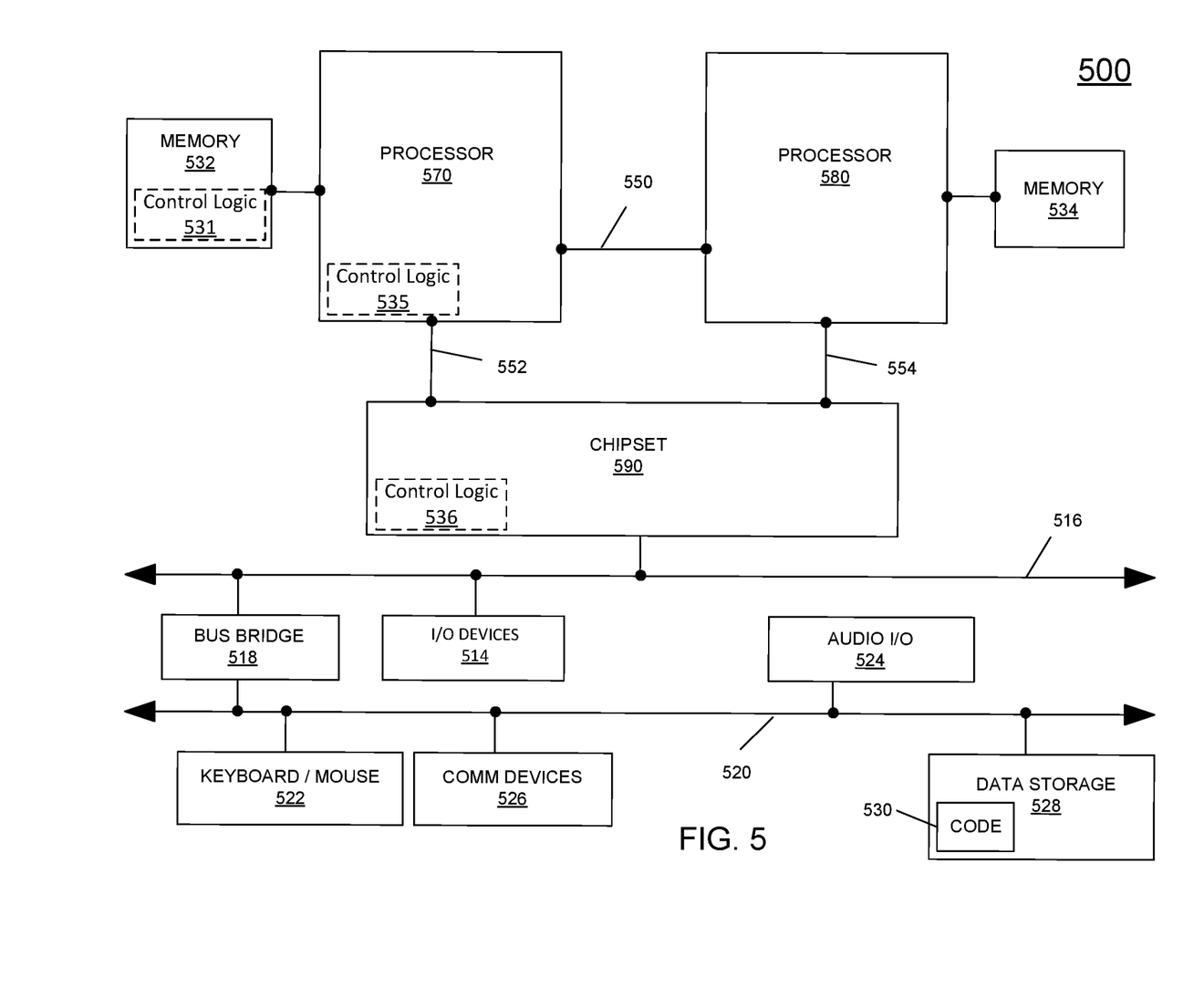
FIG. 5 includes a system for implementing embodiments of the invention.

Below FIGS. 1-5 are discussed. FIG. 1 assumes a situation where two peers are already authenticated to one another and there is a secure connection between the two peers. FIG. 1 thus addresses an embodiment with GUIs that a peer may use to share content with another peer. In contrast to FIG. 1, FIG. 2 concerns an embodiment that focuses less on the GUI level of an embodiment and more on the software architecture of the embodiment. FIG. 2 addresses inter-peer control and data paths that exist when peers are already authenticated to one another and there is a secure connection between the two peers in and embodiment of the invention. The control path is for sharing control information and the data path(s) are for content sharing. FIG. 3, unlike FIGS. 1 and 2, concerns an embodiment that does not assume the two peers are already authenticated to one another or that there is a secure connection between the two peers. FIG. 3 instead addresses an embodiment for establishing a secure connection between the two peers and also pairing the two peers so that they are truly authenticated to one another. FIG. 4 concerns an embodiment that assumes the two peers have already been authenticated to one another, possibly after a previous pairing between the two devices. Thus, FIG. 4 concerns a way to bypass the pairing protocol on subsequent connections between pairs while still ensuring there is a secure, encrypted connection between the peers for content sharing. FIG. 5 concerns an example system for implementing peer devices.

With the general concepts regarding FIGS. 1-5 in mind, FIG. 1 is now discussed in greater detail. FIG. 1 includes GUIs in an embodiment of the invention for P2P sharing. Compute nodes 105, 155 may be tablets, mobile phones, personal digital assistants, ultra-books, and the like. First compute node 105 includes a screen having a visual depiction of content 108 (e.g., news feed, web contents, video, picture). Second compute node 155 may also include a visual depiction of content 158 of its own. When the user of node 105 wants to share content with other peers, he/she presses, clicks, or generally selects the "Share" GUI element 107 (e.g., button) to trigger device discovery and a P2P sharing service. Peer discovery is discussed in greater detail below with regard to, for example, FIG. 3. After "Share" button 107 (which is similar to element 157 of node 155) is selected, button 107 may become or transform to an "Unshare" button (not shown). Selection of the "Unshare" button stops the P2P networking service and disconnects the peers from one another.

FIG. 1 assumes node 105 has successfully discovered several other peers with trusted credentials and has established connections with those discovered peers. For example, node 105 has discovered node 155 and connected with node 155 via connection 117. An embodiment of the connection itself is discussed further below in regards to, for example, FIGS. 2 and 3. Connection 117 couples nodes 105, 155 and results in user avatar 102 showing up on node 101. In other words, avatar 102 corresponds to the user of node 155. In a similar manner, avatar 151 corresponds to unit 105. Each user avatar represents a connected peer device. As seen in FIG. 1, both of nodes 105 and 155 are connected to a third node (not shown) that is associated with avatar 101. Each user avatar on node 105 represents a peer that has previously paired (see, e.g., FIG. 3) with node 105 and is currently connected to node 105. While avatars are used as an example for FIG. 1, various GUI elements (e.g., buttons) may be used to represent a coupled peer.

With avatar 102 on unit 105, the user of unit 105 may click on content 108 and then share or drag (arrow 110) content 108 over to desired user avatar 102 and drop content 108 on avatar 102. After this "Drag-n-drop" operation, content 108 will be delivered to destination device 155 (associated with avatar 102) without further user intervention. Node 155 may perform a similar action via arrow 160.

If the user of node 105 does not see a desired destination/peer, he or she can press "Add new user" GUI element (e.g., button) 106 (which is similar to element 156 of node 155). "Add new user" button 106 engages unit 105 in a discovery process (see, e.g., FIG. 3) to identify potential peers, and a pairing process (see, e.g., FIG. 3) to authenticate any previously unauthenticated (but now discovered) peers or a secure connection process to securely connect, via an encrypted path, with a peer that had previously been authenticated to peer 105 (see, e.g., FIG. 4).

FIG. 2 includes inter-peer control and data paths in an embodiment of the invention. First compute node 205 couples to second compute node 255. As described with FIG. 1, nodes 205, 255 may respectively include GUIs 203, 263 with depictions of content 210, 260 that can be respectively dragged (arrows 210, 268) over avatars 201, 251. However, before doing so a secure connection may be implemented. Creating this secure connection is discussed in FIG. 3, as an example, and relies on device discovery and on creating a secure connection between nodes 205, 255. Device discovery is handled via blocks 213, 263. Establishing a secure connection relies on connection manager 212, 262 (see, e.g., block 306 of FIG. 3).

If nodes 205, 255 have not been previously authenticated to one another, a pairing step (see, e.g., FIG. 3) may occur to couple node 255 to node 205 and thereby provide GUI avatars 201, 251. Pairing relies on pairing blocks 211, 261. Background service and application modules 214, 264 run in a separate thread in the background to maintain state information regarding, for example, network connection and authentication states between nodes 205, 255 (see, e.g., FIG. 3).

Once nodes 205, 255 are authenticated to one another and a secure connection 217 exists between the two nodes, a persistent secure transmission control protocol (TCP) connection 218 is set up between the peers for the purpose of control information transfer (e.g., information regarding network maintenance, network diagnosis, and the like). Either of the two nodes may initiate control path 218 set up by acting as a client and transmitting a request to the other node's server listener (e.g., 267 in FIG. 2). Also, in one embodiment data path 219 is set up "on demand" whenever content 210 and/or 260 is ready to share between devices 205, 255. The "Sharing Source" (e.g., node 255) initiates data path 219 set up by acting as a client and transmitting a request to the server listener, 217, of "Sharing Destination" node 205. Data path 219 is disabled or "torn down" after the content transfer is complete to release resources held up on both ends of the P2P connection. Separating control path 218 and data path 219 helps ensure delivery of network maintenance and control information via path 218 does not suffer head of queue blocking when there is high content traffic. Paths 218, 219 may both be Secured Socket Layer (SSL) connections.

In an embodiment each TCP or SSL connection utilizes a server side and a client side. For control path 218, either peer 205, 255 can act as the server with the other peer acting as the client. In the example of FIG. 2 the peer that starts the control path 218 request or mTLS handshake becomes the client in the P2P connection. In other words, in FIG. 2 peer 205 acts as client 216 and peer 255 acts as server 266. Both peers have a server listener 217, 267 so each peer can accept connection requests from clients. For on-demand data path 219, the sharing source (e.g., peer 255) starts client 265 and connects to the Sharing Destination (e.g., peer 205) server 215. Thus, for on-demand data path 219 sharing source 255 is the client 265 and sharing destination 205 is the server 215. Note that any node can be the sharing source and start an on-demand data path in a P2P network.

FIG. 3 includes authentication signaling flow in an embodiment of the invention. More specifically, FIG. 3 addresses the scenario where one of two mobile devices does not "remember" having paired with the other device (e.g., possibly because the devices have never paired together). Thus, FIG. 3 includes an embodiment for discovering another peer (e.g., block 301), establishing a secure and encrypted connection with another peer (e.g., block 306), and authenticating peers to one another (e.g., block 315).

In greater detail, the process of FIG. 3 begins with nodes 305, 355 each respectively starting a control socket and begin to listen on a network port (e.g., CMD_PORT) 303, 304. For example, sharing source (node 355) generates a server socket with a random port number (block 304).

In block 301 peer discovery commences using an implementation of, for example, multi-cast domain name system (mDNS). Various discovery protocols are suitable. For example, the Java multi-cast domain name system (JmDNS) protocol may be used in FIG. 3. The JmDNS protocol is used for discovering peers on the same network. JmDNS is a Java implementation of mDNS and can be used for service registration and discovery in local area networks. JmDNS concerns zero configuration IP networking. mDNS and DNS service discovery provide methods for devices and services to register themselves, and to discover other network-based services without relying on centrally administered services such as a central DNS server. Embodiments are not limited to JmDNS but may use various configuration protocols, including zero configuration networking techniques that automatically create a usable Internet Protocol (IP) network without manual operator intervention or special configuration servers.

For the "first time" or initial pairing procedure, node 355 may encode network information (e.g., service set identifier (SSID), security type, password, IP address, port number, Android ID, personal identification number (PIN) number, and the like) in, for example, a quick response (QR) code. For example, the QR code may include SSID (S)=myPhone; SecurityType (T)=WPA; Password (P)=supersecret; IP Address (A)=143.183.47.56, Port Number (N)=1469; Android ID (I)=324759, and PIN=854637. Node 355 displays the QR code on its screen. Node 305 then scans the QR code and decodes the information included therein. Node 305 may then connect to a network (e.g., Wi-Fi network) and node 355 based on the decoded information.

In block 306 nodes 355, 305 may engage in a Mutual Transport Layer Security (mTLS) handshake protocol whereby, for example, node 355 sends its certificate to node 305 to signal its intention to pair with node 305. In block 308 node 305 may not recognize the certificate sent from node 355. However, node 305 and 355 will complete the certificate exchange process based on the mTLS handshake. After the mTLS handshake, node 305 may send an "untrusted" message (arrow 309) to node 355. Also, considering node certificates were exchanged via the mTLS handshake (block 306), node 355 should have the certificate for node 305. In block 310 node 355 may not recognize node 305 certificate and may send an untrusted message (arrow 312) to node 305. In an embodiment, the certificates are self signed by their respective nodes. Via block 310 and line 312 symmetry and consistency of state machines are maintained for both nodes 305, 355. Doing so may avoid "deadlock" and/or "livelock." Block 307 may result in an encrypted channel between the peers.

Considering the untrusted messages 309, 312, pairing may be necessary and node 305 may initiate a pairing request (arrow 313). The request may include a user name for node 305 to facilitate certain authentication pairing protocols. Assuming node 355 accepts the pairing request (blocks 311 and 314), nodes 305, 355 may engage in a Secure Remote Password (SRP) protocol (without the acceptance the pairing protocol may end and the SSL socket between the peers may be closed). Such a protocol may allow node 355 to authenticate itself to node 305 (and vice versa) in a very secure way. SRP is resistant to dictionary attacks mounted by an eavesdropper, and it does not require a trusted third party such as a key provisioning server. It conveys a zero-knowledge password or secret proof from node to node. For example, the authentication may take place based on a secret, such as a PIN transferred via the QR code, orally between users, one user seeing the secret displayed on the user's mobile device, NFC, and the like. No secret (e.g., password) need be exchanged via a wireless connection that could be snooped by a third party. The large private key secret (e.g., PIN) shared between the two parties (block 315) verifies to both nodes 305, 355 that the nodes' respective keys or secrets are identical and that both sides have the user's secret.

In greater detail, for one embodiment when SRP is completed a SRP Session key (K) exists from which a new key K' may be derived. A Hash-based Message Authentication Code (HMAC) then binds K' and the peer endpoints (e.g., to the certificates used in the mTLS connection). This binding may be done via concatenation with the certificates and may be "reversed" to prevent a replay of a packet back from one of the peers. Each or either of the endpoints (peers) may send a HMAC to the other peer to verify pairing has been successfully achieved in the past (i.e., based on comparing HMACs). Either peer can opt to abort the P2P connection if the hashes do not match (i.e., indicating a MiTM attack is likely).

The SRP protocol is used as an example for FIG. 3 but other protocols, including other zero-knowledge password protocols, may be used.

SRP authentication (or various other authentication protocols) may be very resistant to snooping and adept at MiTM detection (block 316). In block 317 both nodes add each other as trusted peers (e.g., in a trusted peers list) and connected peers (e.g., in a connected peers list) so user avatars (which are transferred between devices upon successful pairing) are displayed on the respective nodes. Furthermore, act 317 helps avoid future pairing activities between the two now mutually authenticated peers 305, 355. FIG. 4 addresses this very scenario.

In an embodiment, even if exchanged certificates (see block 306) are recognized, if there has been no pairing during previous sessions between the peers pairing may be used. For example, if the certificates of block 306 are self signed the pairing process (e.g., block 315) may be needed to provide more robust and truer mutual authentication.

FIG. 4 includes signaling flow in an embodiment of the invention wherein pairing is no longer used between peers. FIG. 4 concerns the situation where the pairing of FIG. 3 has already taken place and each of nodes 405, 455 remember having previously paired with one another. Thus, blocks 403, 404, 405, 406 correspond to blocks 303, 304, 305, 306 of FIG. 3. These blocks help establish an encrypted, secure SSL connection between the two devices (e.g., via secure layers L2 and L3), which may be required in some embodiments of the invention (but not others) before content sharing may take place. However, in blocks 407, 408 node 405 recognizes the ID and/or certificate of node 455. This could be based on comparing the received certificate with stored certificates (e.g., located in a trusted platform module (TPM) of the peer). Node 405 sends a message indicating the "trusted" status of node 455 (arrow 409). In block 410 node 455 recognizes the certificate from node 405 and sends a corresponding trusted message via arrow 411. At block 412, a secure connection between nodes 405, 455 is set up without the need for the SRP pairing of FIG. 3 (e.g., blocks 311, 313, 314, 315). This presents advantages over other technologies that may require, for example, the peers to "bump" one another each and every time content sharing is desired.

Thus, with FIGS. 1-4 in mind, an embodiment allows a user to press a "Share" button on a first peer and thereby trigger JmDNS based discovery, for example, to search for a second peer. The first peer may register the appropriate discovered information and set the query interval for updating the "Unknown Peers" list. As noted above, register information for JmDNS discovery may include, for example, User name, Device name, Android ID, IP address, and Port number. When any of the registered information is changed, JmDNS may be used to re-register the new information. The networking service may obtain the "Unknown Peers" list from the JmDNS discovery protocol and provide the "Saved Peers" list and "Connected Peers" list to JmDNS. If a discovered device (second peer) has an ID (e.g., Android ID) that matches one of the IDs saved in the first peer, the first peer may automatically establish a TCP connection with the second peer and show the avatar of second peer. If the "Unshare" button is clicked, JmDNS unregisters the information and the networking service is stopped.

In an embodiment, when the QR code data transfer protocol described above is not supported a user may click on "Add new user" (block 106 of FIG. 1). Doing so causes a list of "Unknown peers" to be shown on the screen. The list may contain users/devices discovered on the WLAN that have not been seen before. The list may be dynamically generated based on devices discovered by JmDNS. If a user wants to add a particular user displayed in the list, he/she may simply click on the item in the list (e.g., a listing that provides "David's Phone"). Once an item is clicked, the current device immediately retrieves IP address and Port information from the "Unknown Peers" and establishes a temporary TCP connection to the selected device.

Embodiments may be implemented in many different system types. Referring now to FIG. 5, shown is a block diagram of a system (e.g., peer node 105) in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Code may be included in one or more memories including memory 528, 532, 534, memory coupled to system 500 via a network, and the like. Further, an audio I/O 524 may be coupled to second bus 520.

Embodiments may be implemented in code and may be stored on at least one storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

In one embodiment, use of the term control logic includes hardware, such as transistors, registers, or other hardware, such as programmable logic devices (535). However, in another embodiment, logic also includes software or code (531). Such logic may be integrated with hardware, such as firmware or micro-code (536). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

Thus, an embodiment includes a method executed by at least one processor (e.g., processor 570) comprising a first compute node: establishing a persistent control path (e.g., path 218) with a second compute node; establishing an on-demand data path (e.g., path 219) with the second compute node; and communicating control information to the second compute node via the persistent control path while simultaneously communicating content to the second compute node via the on-demand data path. An embodiment may promptly disable the established on-demand data path after communicating the content to the second compute node while simultaneously maintaining the persistent control path after communicating the control information to the second compute node. An embodiment may establish the on-demand data path with the second compute node based on determining the content exists and is ready to be communicated to the second compute node. An embodiment may establish the persistent control path and the on-demand data path with the second compute node via a peer-to-peer network, wherein the network is not contained within a single local network (e.g., across several local area networks, across several routers included in the internet, and the like). An embodiment may include establishing the persistent control path and the on-demand data path with the second compute node via a peer-to-peer network and not via a centralized server.

An embodiment may concern establishing a secure communication between mobile peers in a P2P network. A method may include a first peer receiving a second certificate corresponding to the second compute node; determining the second certificate is recognized by the first compute node; communicating a first certificate, corresponding to the first compute node, to the second compute node; and establishing the persistent control path with the second compute node based on both of the first and second certificates. However, an embodiment may include pairing. For example, an embodiment may include receiving a second certificate corresponding to the second compute node; communicating a first certificate, corresponding to the first compute node, to the second compute node; determining one of the first and second certificates is not recognized by one of the first and second compute nodes; based on determining one of the first and second certificates is not recognized by one of the first and second compute nodes, engaging in pairing (e.g., SRP protocol) that includes communicating a secret, via an out of band channel (e.g., orally, QR code, and the like) between the first and second compute nodes and authenticating the second node based on the secret. An embodiment includes authenticating the second compute node without using a central certificate server (e.g., CA). An embodiment includes engaging in the pairing based on one of the first and second compute nodes accepting a pairing invitation.

In an embodiment pairing may be skipped once it has successfully been completed between two pairs. For example, an embodiment may include the first node, during a subsequent session with the second node, receiving another instance of the second certificate corresponding to the second compute node; communicating another instance of the first certificate, corresponding to the first compute node, to the second compute node; determining both of the first and second additional instances are respectively recognized by the first and second compute nodes; based on determining both of the first and second additional instances are respectively recognized by the first and second compute nodes, skipping pairing and establishing additional instances of the persistent control path and on-demand data path with the second compute node.

An embodiment may include receiving a GUI element, which corresponds with the second compute node, from the second compute node based on establishing the persistent control path with the second compute node. An embodiment may include communicating content to the second compute node based on dragging a GUI element corresponding with the content to the GUI element corresponding to the second compute node.

The GUI element may be included in cooperation with the authentication protocols above (e.g., FIGS. 3 and 4), and/or the dual data and controls paths (e.g., FIG. 2). Also, the dual data and controls paths may be present alone or in combination with the authentication protocols above. Further, the authentication protocols may be part of an embodiment that does not include the GUI elements or the dual paths.

All optional features of apparatus(s) described above may also be implemented with respect to method(s) or process(es) described herein. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory machine-readable storage device comprising a set of instructions, which when executed by at least one processor of a first device, cause the at least one processor to perform operations to:
cause a first device client of the first device to send a discovery request to a second device server of a second device, wherein the first device includes a first device server and the first device client, and the second device includes a second device client and the second device server, wherein the respective first device client and first device server of the first device enables the first device to act in a client or server role, and wherein the respective second device client and second device server of the second device enables the second device to act in a client or server role, and wherein a first data connection of the first device client and the second device server occurs in parallel with a second data connection of the first device server and the second device client;
process a response to the discovery request of the second device server, by the first device client, the response including data to identify a content resource of the second device server; and
cause the first device client to retrieve content from the content resource of the second device server,
wherein the discovery request and the content are transmitted using separate data connections between the first device and the second device, and
wherein the content is to be communicated using an on-demand message exchange that includes one or more messages exchanged statelessly between the first device and the second device, wherein a data path for the message exchange is started on-demand to transfer the messages.

2. The machine-readable storage device of claim 1, wherein the discovery request is sent to the second device via a multi-cast message.

3. The machine-readable storage device of claim 1, wherein a first connection used to communicate the discovery request and the response to the discovery request is an unsecured network connection, and wherein a second connection used to communicate the content is a secured network connection.

4. The machine-readable storage device of claim 3, wherein the secured network connection includes use of a Transport Layer Security (TLS) secure communication protocol.

5. The machine-readable storage device of claim 1, wherein the second device client is adapted to send a second discovery request to the first device server, and wherein the first device server is adapted to provide second content to the second device client after the second discovery request.

6. The machine-readable storage device of claim 1, wherein the data path for the message exchange is ended upon transfer of the messages.

7. A first computing device, comprising:
communications circuitry, comprising circuitry adapted to transmit and receive respective communications via a network with a second computing device; and
processing circuitry to:
cause a first device client of the first computing device to send a discovery request to a second device server of the second computing device, wherein the first computing device includes a first device server and the first device client, and the second computing device includes a second device client and the second device server, wherein the respective first device client and first device server of the first computing device enables the first computing device to act in a client or server role, and wherein the respective second device client and second device server of the second computing device enables the second computing device to act in a client or server role, and wherein a first data connection of the first device client and the second device server occurs in parallel with a second data connection of the first device server and the second device client;
process a response to the discovery request of the second device server, by the first device client, the response including data to identify a content resource of the second device server; and
cause the first device client to retrieve content from the content resource of the second device server,
wherein the discovery request and the content are transmitted using separate data connections between the first computing device and the second computing device, and
wherein the content is to be communicated using an on-demand message exchange that includes one or more messages exchanged statelessly between the first computing device and the second computing device, wherein a data path for the message exchange is started on-demand to transfer the messages.

8. The computing device of claim 7, wherein the discovery request is sent to the second computing device via a multi-cast message.

9. The computing device of claim 7, wherein a first connection used to communicate the discovery request and the response to the discovery request is an unsecured network connection, and wherein a second connection used to communicate the content is a secured network connection.

10. The computing device of claim 9, wherein the secured network connection includes use of a Transport Layer Security (TLS) secure communication protocol.

11. The computing device of claim 7, wherein the second device client is adapted to send a second discovery request to the first device server, and wherein the first device server is adapted to provide second content to the second device client after the second discovery request.

12. The computing device of claim 7, wherein the data path for the message exchange is ended upon transfer of the messages.

13. A method for client-server networking, performed by processing circuitry of a first device, the method comprising:
causing a first device client of the first device to send a discovery request to a second device server of a second device, wherein the first device includes a first device server and the first device client, and the second device includes a second device client and the second device server, wherein the respective first device client and first device server of the first device enables the first device to act in a client or server role, and wherein the respective second device client and second device server of the second device enables the second device to act in a client or server role, and wherein a first data connection of the first device client and the second device server occurs in parallel with a second data connection of the first device server and the second device client;
processing a response to the discovery request of the second device server, by the first device client, the response including data to identify a content resource of the second device server; and causing the first device client to retrieve content from the content resource of the second device server, wherein the discovery request and the content are transmitted using separate data connections between the first device and the second device, and wherein the content is to be communicated using an on-demand message exchange that includes one or more messages exchanged statelessly between the first device and the second device, wherein a data path for the message exchange is started on-demand to transfer the messages.

14. The method of claim 13, wherein the discovery request s sent to the second device via a multi-cast message.

15. The method of claim 13, wherein a first connection used to communicate the discovery request and the response to the discovery request is an unsecured network connection, and wherein a second connection used to communicate the content is a secured network connection.

16. The method of claim 15, wherein the secured network connection includes use of a Transport Layer Security (TLS) secure communication protocol.

17. The method of claim 13, wherein the second device client is adapted to send a second discovery request to the first device server, and wherein the first device server is adapted to provide second content to the second device client after the second discovery request.

18. The method of claim 13, wherein the data path for the message exchange is ended upon transfer of the messages.

* * * * *

UNITED STATES PATENT AND TRADEMARK OFFICE
CERTIFICATE OF CORRECTION

PATENT NO. : 10,764,943 B2  
APPLICATION NO. : 16/103563  
DATED : September 1, 2020  
INVENTOR(S) : Michelle X. Gong Page 1 of 1

It is certified that error appears in the above-identified patent and that said Letters Patent is hereby corrected as shown below:

On the Title Page

Page 2, Column 2, item [56], Line 14, delete "Jun." and insert --May-- therefor

In the Claims

Column 13, Line 15, Claim 14, delete "s" and insert --is-- therefor

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*